United States Patent [19]

Imai

[11] Patent Number: 5,074,482

[45] Date of Patent: Dec. 24, 1991

[54] MICROFILM RETRIEVAL APPARATUS

[75] Inventor: Masaru Imai, Kanagawa, Japan

[73] Assignee: Fuji Photo Film Co., Ltd., Kanagawa, Japan

[21] Appl. No.: 509,827

[22] Filed: Apr. 17, 1990

[30] Foreign Application Priority Data

Apr. 20, 1989 [JP] Japan .................................. 1-100809

[51] Int. Cl.$^5$ .............................................. G03B 21/00
[52] U.S. Cl. .............................. 242/67.30 R; 242/71.9; 242/195
[58] Field of Search ........................ 242/71.9, 71.8, 73, 242/67.3 R, 195

[56] References Cited

U.S. PATENT DOCUMENTS

| 2,357,065 | 8/1944 | Zaica | 242/71.9 |
|---|---|---|---|
| 3,266,748 | 8/1966 | Le Bus, Sr. | 242/71.9 |
| 3,342,435 | 9/1967 | Gelardi et al. | 242/71.8 |
| 3,659,799 | 5/1972 | Cerrutti et al. | 242/71.9 |
| 3,825,202 | 7/1974 | Robinson | 242/71.9 |
| 3,840,198 | 10/1974 | Moore | 242/71.9 |

Primary Examiner—Daniel P. Stodola
Assistant Examiner—John Q. Nguyen
Attorney, Agent, or Firm—Sughrue, Mion, Zinn, Macpeak & Seas

[57] ABSTRACT

A microfilm retrieval apparatus is capable of retrieving a desired image from images recorded on a microfilm by winding a microfilm, which wound on a cassette reel, on a take-up reel after one end of the microfilm has been wound on the take-up reel and held thereby, and rewinding the microfilm on said cassette reel, the take-up reel comprising a shaft member, a take-up member which is rotatably supported by the shaft member and on the outer periphery of which the microfilm is wound, and two disks which are rotatably supported by the shaft member at both ends of the take-up member and which are rotated around the shaft member together with the take-up member. The two disks can be moved in the direction of separation from each other and can be oscillated around the rotatably supporting portions of the shaft member. The take-up reel therefore allows microfilms having various widths to be wound thereon.

20 Claims, 15 Drawing Sheets

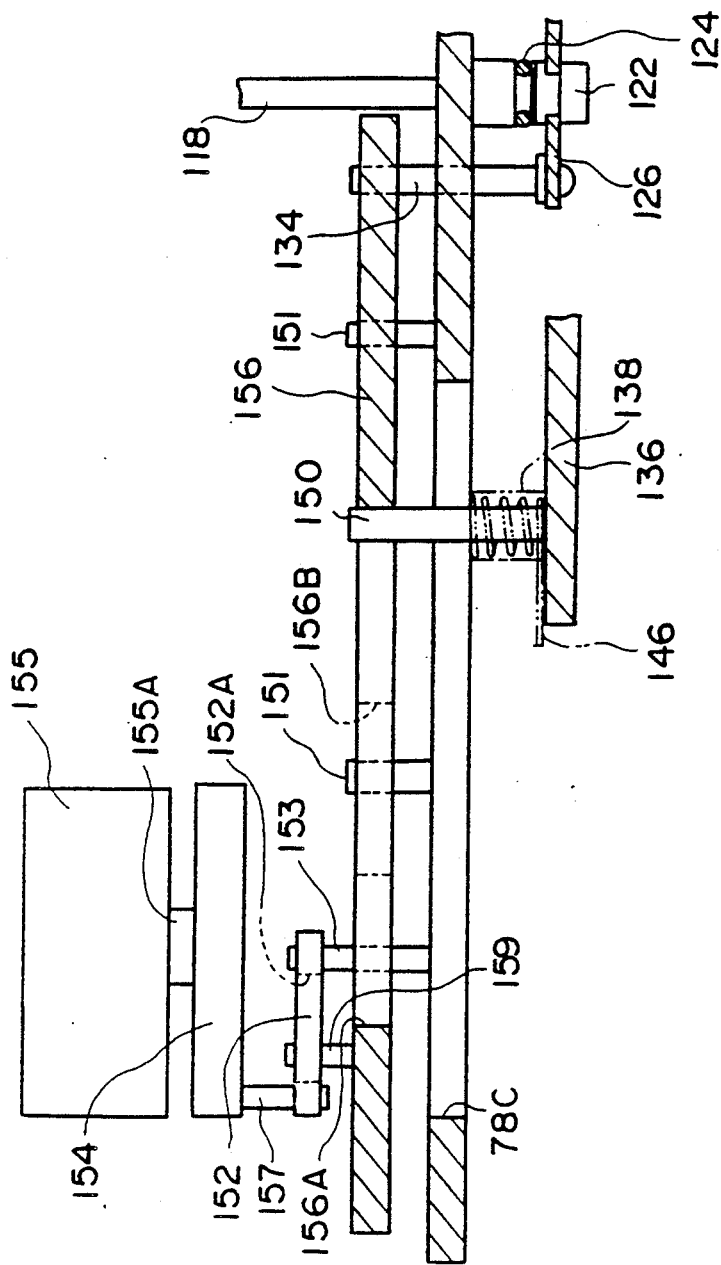

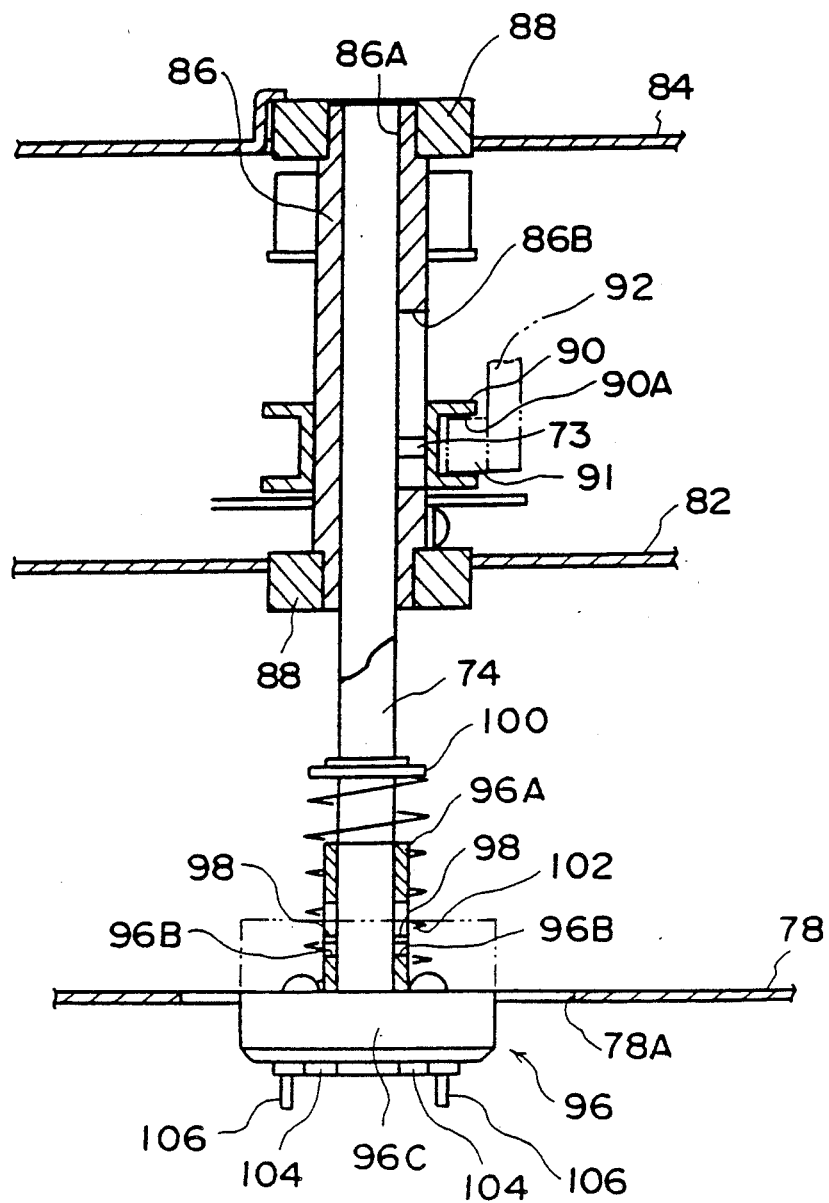

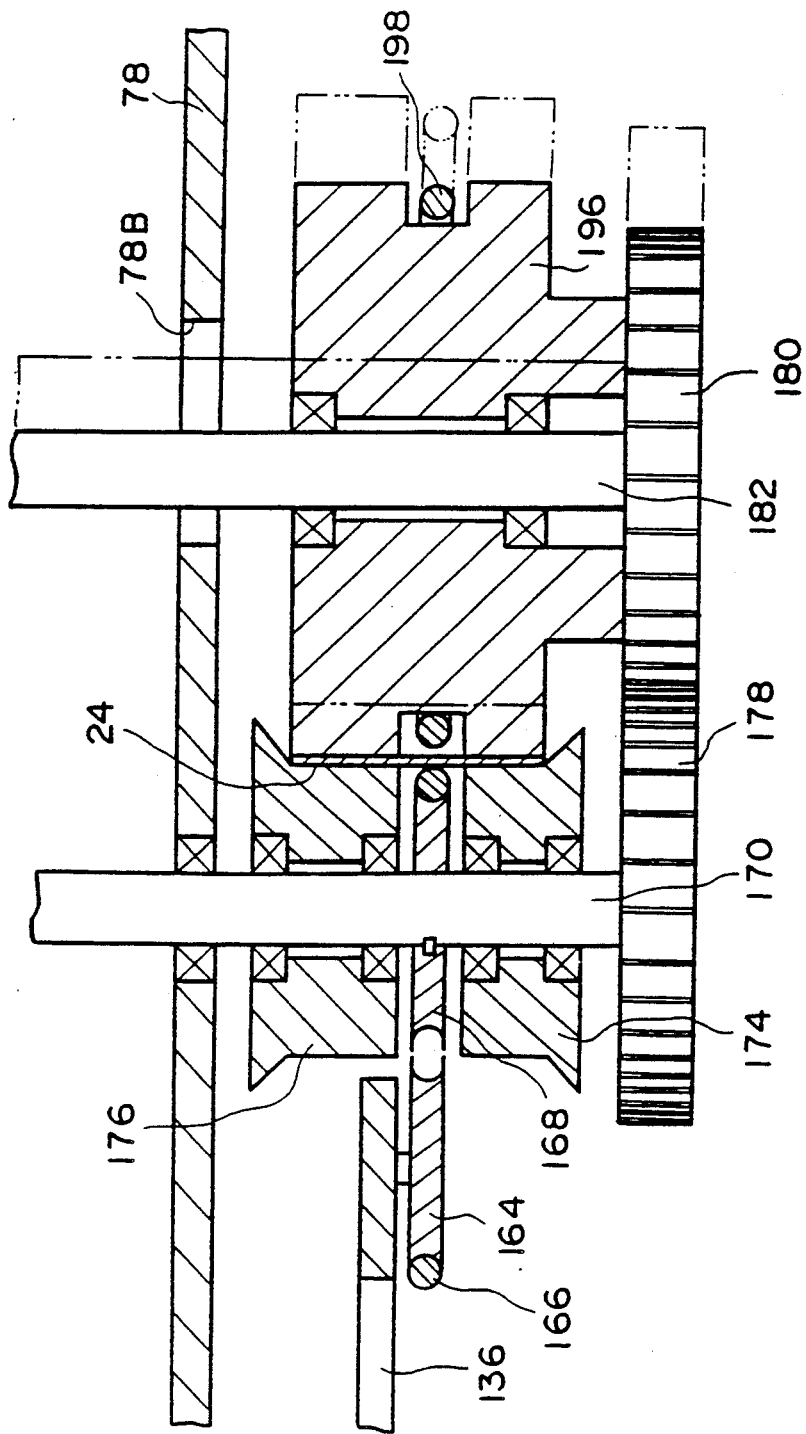

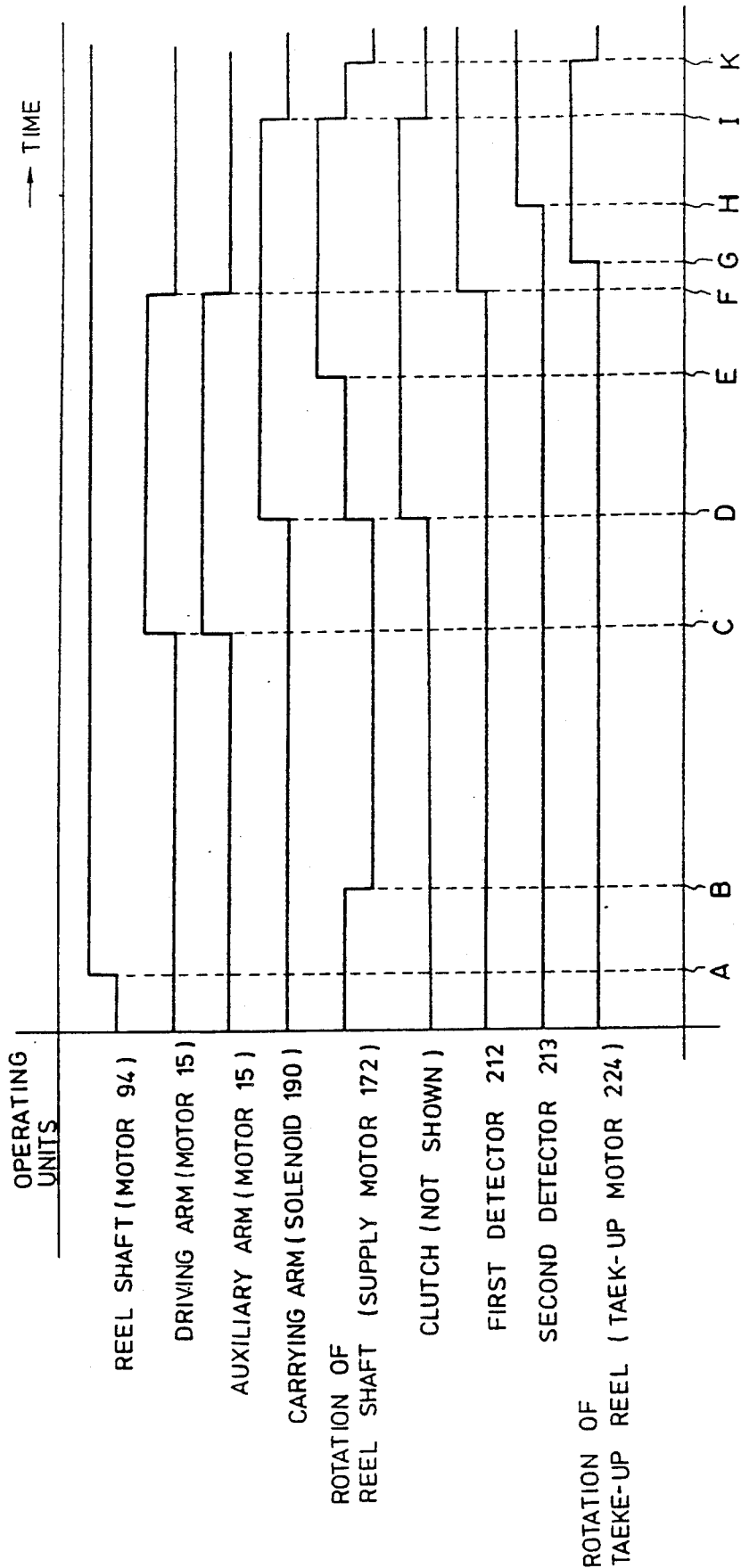

MICROFILM RETRIEVAL APPARATUS

BACKGROUND OF THE INVENTION

The present invention relates to a microfilm retrieval apparatus for retrieving a desired image from the images recorded on the microfilm.

A reader printer which is capable of retrieving a desired image from the images recorded on a microfilm, displaying and copying the image retrieved has been proposed.

In this reader printer, when a cassette reel on which the microfilm is wound is loaded in a loading section, one end of the microfilm is automatically discharged from the cassette reel by a so-called autoloading mechanism and wound on a take-up reel.

The take-up reel, on which the end of the microfilm is wound, comprises a take-up shaft and two disks supported by the take-up shaft, the distance between the two disks being set to a value smaller than the width at the end of the microfilm. The two disks are made of resin so as to be deformable in the direction of separation from each other.

When the end of the microfilm discharged from the cassette reel reaches the take-up reel, the end of the microfilm is held between the two disks in a state wherein the two disks are deformed by the end of the microfilm in the direction of separation from each other. The microfilm which is held between the two disks at its end is successively wound on the take-up shaft. On the other hand, the widths of microfilms depend upon standards, manufacturing companies and the like, for example, the width is set to 15 mm in the case of a FF cartridge, it is set to 16 mm on the ANSI standard, and it is set to 20.6 mm in the case of 3M Co., Ltd.

In this structure in which the end of the microfilm is held by the take-up shaft, since the two disks are deformed by the end of the microfilm in the direction of separation from each other so that the microfilm is held between the disks with the aid of elastic force, the width at the end of a microfilm, that can be wound, is specified. When a microfilm having one end with a width different from the specified width is wound, therefore, the end of the microfilm cannot be certainly wound by the take-up shaft.

In addition, since the widths at the ends of microfilms depend upon standards and manufacturing companies, as described above, a take-up reel which meets the width at one end of the microfilm used must be used. Although it is thus necessary for retrieval to install a take-up reel which meets the microfilm used in a retrieval apparatus and change for the reel, this work takes much time.

SUMMARY OF THE INVENTION

In consideration of the abovementioned fact, it is an object of the present invention to provide a microfilm retrieval apparatus having a take-up reel which allows a microfilm to be certainly wound on a take-up shaft.

To this end, the present invention provides a microfilm retrieval apparatus for retrieving a desired image from the images recorded on a microfilm by winding and holding one end of the microfilm on a take-up reel and then winding the microfilm on the take-up reel and rewinding it on a cassette reel, the take-up reel comprising two disks; a take-up shaft which rotatably supports the two disks so that the disks are opposed to each other and can be moved in the direction of separation from each other and which has a periphery on which the microfilm is wound between the two disks, the take-up shaft having portions which respectively rotatably support the two disks and which are tapered in such a manner that the diameter of the take-up shaft is gradually reduced from the center to both ends thereof in the lengthwise direction so that the two disks can be deformed in the direction of separation from each other at the start of the winding of the microfilm; and holding means provided on the opposite surfaces of the disks so as to project in the direction of approach to each other for the purpose of holding the microfilm by pressing the widthwise ends of the microfilm wound on the take-up shaft.

In the present invention configured as described above, when one end of the microfilm reaches the take-up shaft between the two disks, the two disks are deformed in the direction of separation from each other. This deformation smoothly and easily takes place because the portions of the take-up shaft which respectively rotatably support the disks are tapered in such a manner that the diameter of the take-up shaft is reduced from the center to both ends thereof. This deformation causes the end of the microfilm to be wound on the take-up shaft and held by the holding means when the two disks moved in the direction of separation from each other is returned to the original positions.

This enables the end of the microfilm to be held and securely wound on the take-up reel.

Further, in the present invention, since the two disks can be moved along the axial direction of the take-up shaft in the direction of separation from each other, the microfilm can be wound regardless of the width of the microfilm to be wound.

The present invention configured as described above enables the end of a microfilm to be held by the holding means when the two disks are moved and deformed in the tapered portions of the take-up shaft in the direction of separation from each other. The invention thus has an excellent effect of enabling one end of each of a plurality of microfilms to be securely held without replacing the take-up reel even if the microfilms have different widths.

BRIEF DESCRIPTION OF THE DRAWINGS

FIG. 6A is a side view of the loading part which particularly shows a relation between a driving arm and an auxiliary arm;

FIG. 7A is a sectional view taken along the line VIIA—VIIA of FIG. 6A;

FIG. 8 is a sectional view of a reel shaft;

FIG. 9 is a sectional view taken along the line IX—IX of FIG. 6;

FIG. 13 is a time chart which shows the operational timing of each of the units.

DESCRIPTION OF PREFERRED EMBODIMENTS

Figure 1:
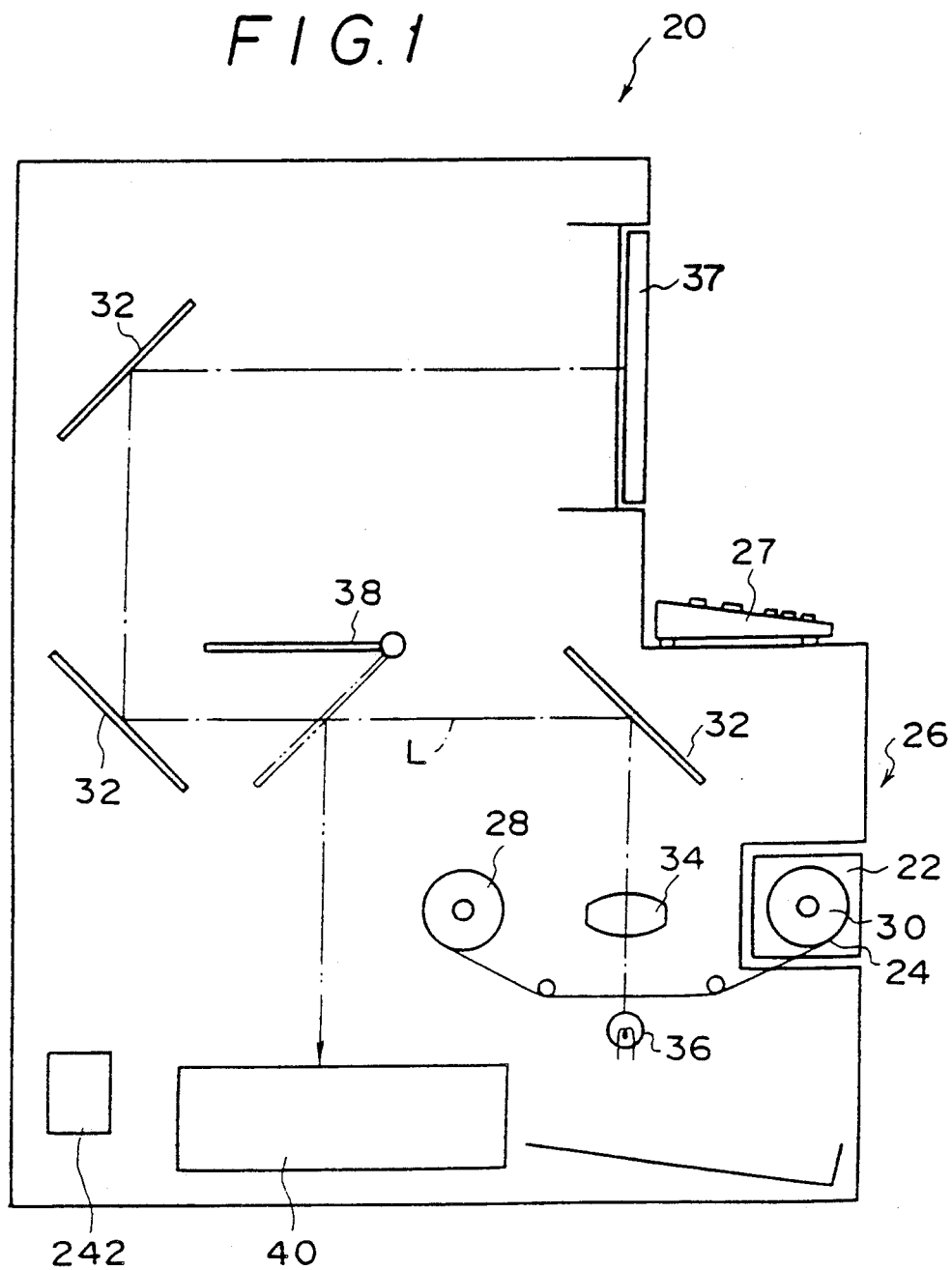
FIG. 1 is a schematic view of the structure of an embodiment of a reader printer to which the preset invention is applied.
Figure 2:
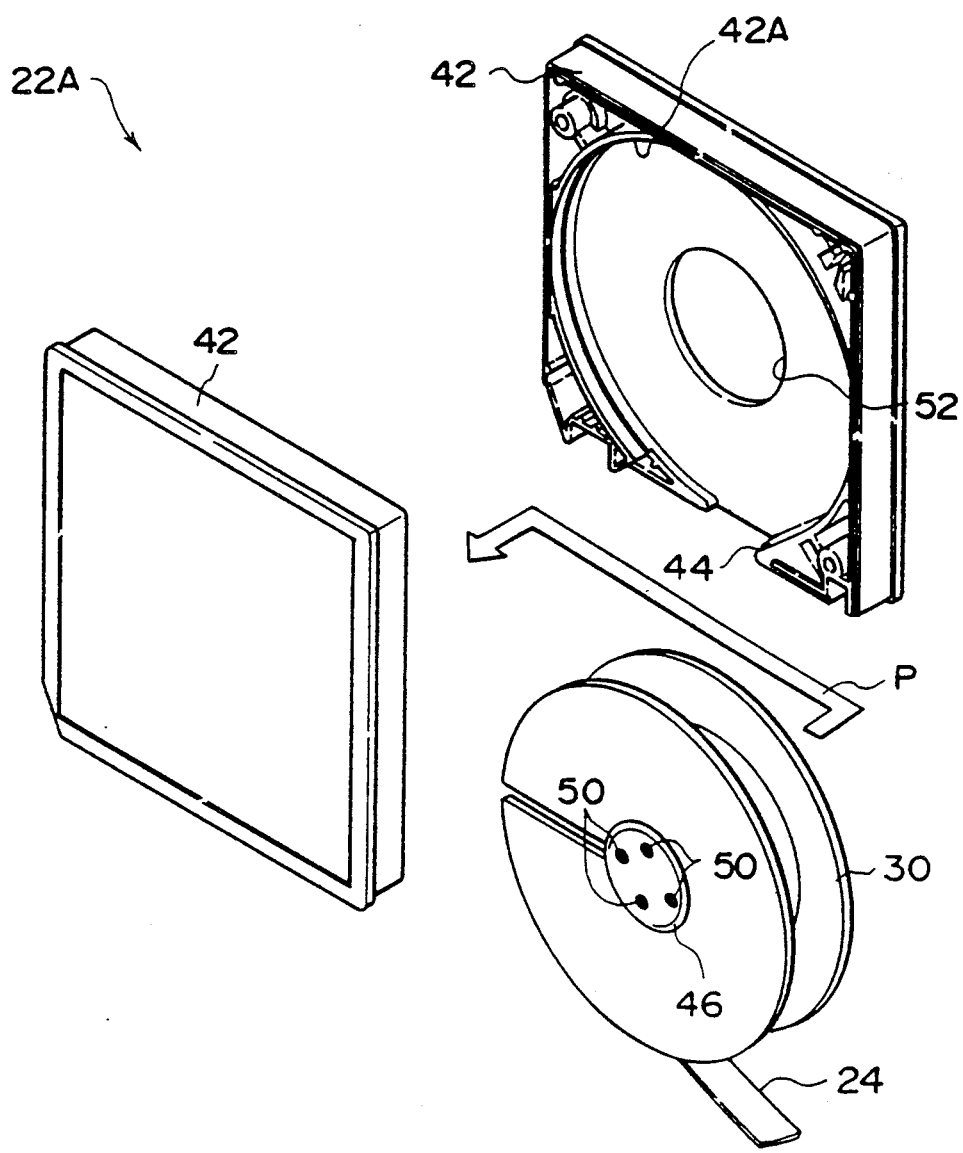
FIGS. 2 and 3 are exploded perspective views of cartridges in each of which a microfilm is received.
Figure 3:
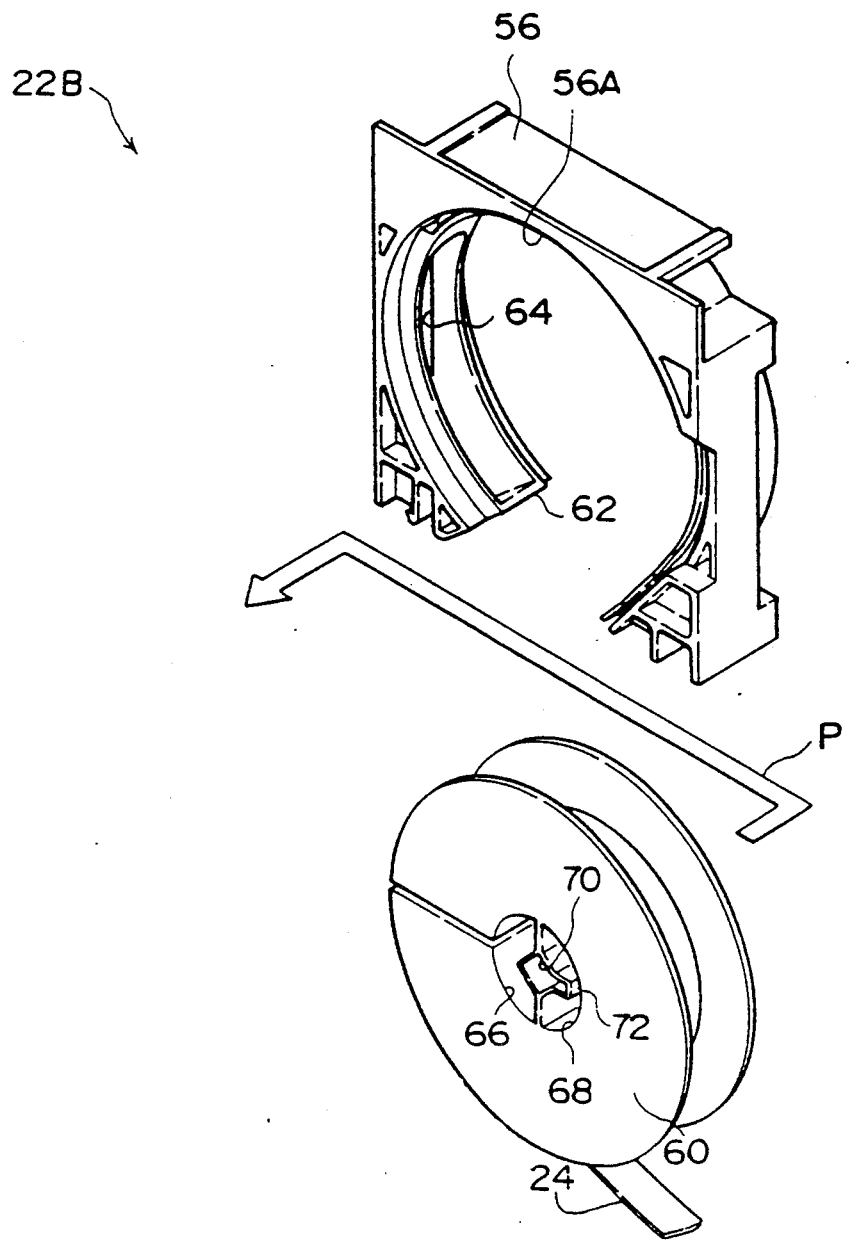

Referring to FIGS. 1 to 3, an embodiment of a reader printer 20 to which a microfilm retrieval apparatus in accordance with the present invention is applied is described below. FIG. 1 is a schematic view of the arrangement of the reader printer 20.

Overall structure of reader printer

As shown in FIG. 1, the reader printer 20 allows the microfilm 24, which is wound on a cassette reel 30 and received in a cartridge 22 made of resin, to be loaded in a loading part 26, one end of the microfilm 24 to be wound on a take-up reel 28 and then the microfilm 24 to be wound thereon. The reader printer 20 is also capable of retrieving any desired image from the images recorded on the microfilm 24 by rewinding the microfilm 24 on the cassette reel 30 in the cartridge 22. In addition, the reader printer 20 is capable of projecting an image recorded on the microfilm 24 by using an optical system comprising a plurality of reflecting mirrors 32, a lens 34 and a light source 36 and copying an image which is guided to a copying apparatus 40 disposed in a lower portion when the optical axis of the image light from the microfilm 24 is changed by a switching mirror 38, as occasion demands.

The reader printer 20 is provided with the loading part 26 and a driving system for the microfilm 24 both of which are designed so that the two types of cartridges 22A and 22B respectively shown in FIGS. 2 and 3 can be used as the cartridge 22.

As shown in FIG. 1, the reader printer 20 is provided with a controller 242 which is connected to a control keyboard 27 disposed above the loading part 26. The operation of each unit can be controlled by the controller 242 on the basis of the input from the control keyboard 27.

Cartridge

As shown in FIG. 2, the cartridge 22A has a circular cassette reel supporting part 42A which is formed on the inside of a case 42 which is divided into two parts. The cassette reel 30 is installed in the cassette reel supporting part 42A (in the direction shown by the arrow P in the drawing). One end of the microfilm 24 can be pulled out from the cassette reel 30 received in the case 42 through the opening 44 formed in the case 42. In the cartridge 22A, a metallic disk 46 is provided at the center of the cassette reel 30. In the metallic disk 46 are formed four small holes 50 around the center at substantially equal distances. A circular hole 52 is formed at the center of one of the two parts of the case 42. In a state wherein the cassette reel 30 is received in the case 42, the small holes 50 provided in the disk 46 are exposed to the outside so as to engage with the reel shaft 74 described below. This type of cartridge is manufactured by 3M Co., Ltd.

On the other hand, in the cartridge 22B shown in FIG. 3, a cassette reel 60 is received in a case 56. A cassette reel supporting part 56A is provided in the case 56 so that the cassette reel 60 is fitted in the cassette reel supporting part 56A. The cartridge 22B is the same as the cartridge 22A in the point that the microfilm 24 is wound on the cassette reel 60, and one end of the microfilm 24 can be pulled out from the cassette reel 60 through the opening 62 formed in the case 56. However, the cartridge 22B is different from the cartridge 22A in the structure of the central portion of the cassette reel 60, the formation of the slit 64 on the side wall of the case 56 and the shape of the opening 62 which is different from that of the opening 44 of the cartridge 22A. In the central portion of the cassette reel 60 are formed two bottomed semicircular holes 66 and 68 which are partitioned by a partition plate. An axial hole 70 having a rhomboid sectional from vertical to the axial direction is formed at the center of the partition plate. In a state wherein the cassette reel 60 is received in the case 56, the bottomed semicircular holes 66, 68 and the axial hole 70 engage with the reel shaft 74. The partition plate forming the rhomboid axial hole 70 has a projection 72 projecting toward the bottomed semicircular hole 68. This sort of cartridge is based on the ANSI standard.

Microfilm driving system

A driving system 76 for driving the microfilm 24 is constituted by a loading driving system and a retrieval driving system. The loading driving system creates a retrievable state wherein a desired image can be retrieved from the images recorded on the microfilm 24, and the retrieval driving system causes the retrieval of a desired image from the images recorded on the microfilm 24.

The loading driving system causes the end of the microfilm 24 to be discharged from the cartridge 22B and wound on the take-up reel 28 after the cartridge 22B (in this embodiment, the case where the cartridge 22B is loaded in the loading potion 26 is described) has been inserted into the loading part 26. The retrieval driving system causes the microfilm 24 to be wound on the take-up reel 28 and rewound on the cassette reel 60, whereby a desired image can be retrieved from the images recorded on the microfilm 24.

A description will now be given of the loading driving system.

Figure 5:
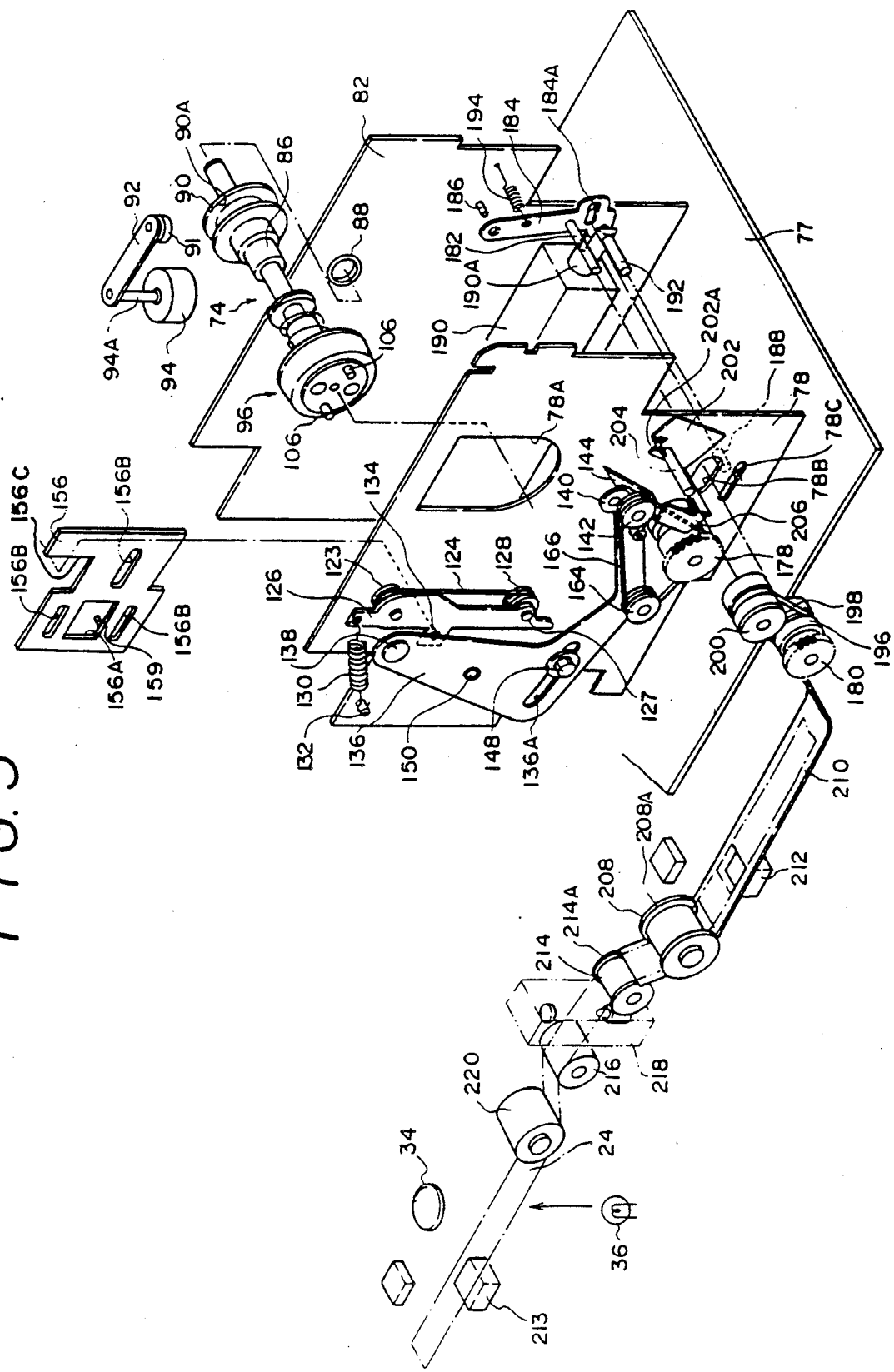
FIG. 5 is an exploded perspective view of a loading part.
Figure 6:
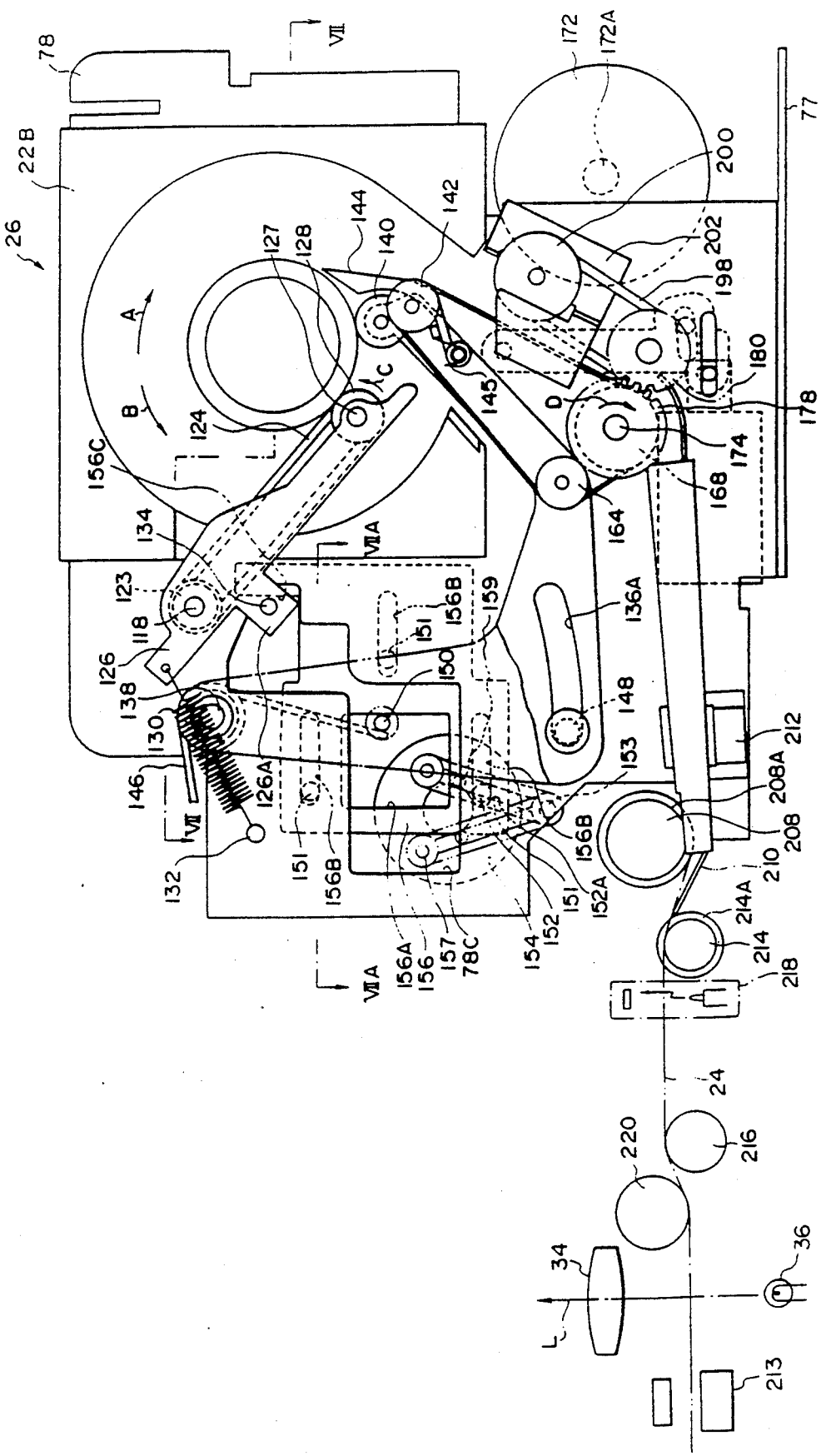
FIG. 6 is a side view of the loading part.
Figure 6:
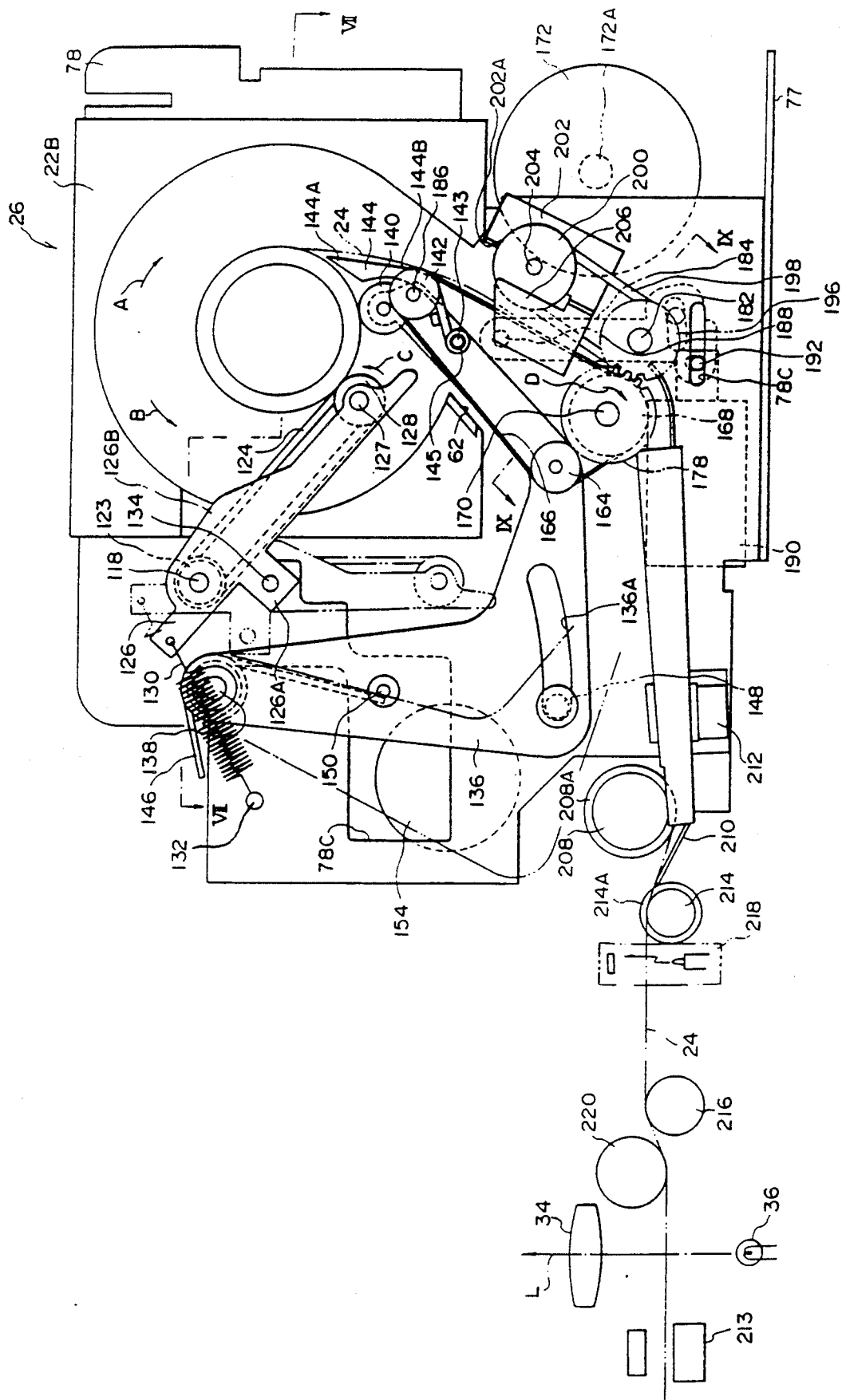
Figure 7:
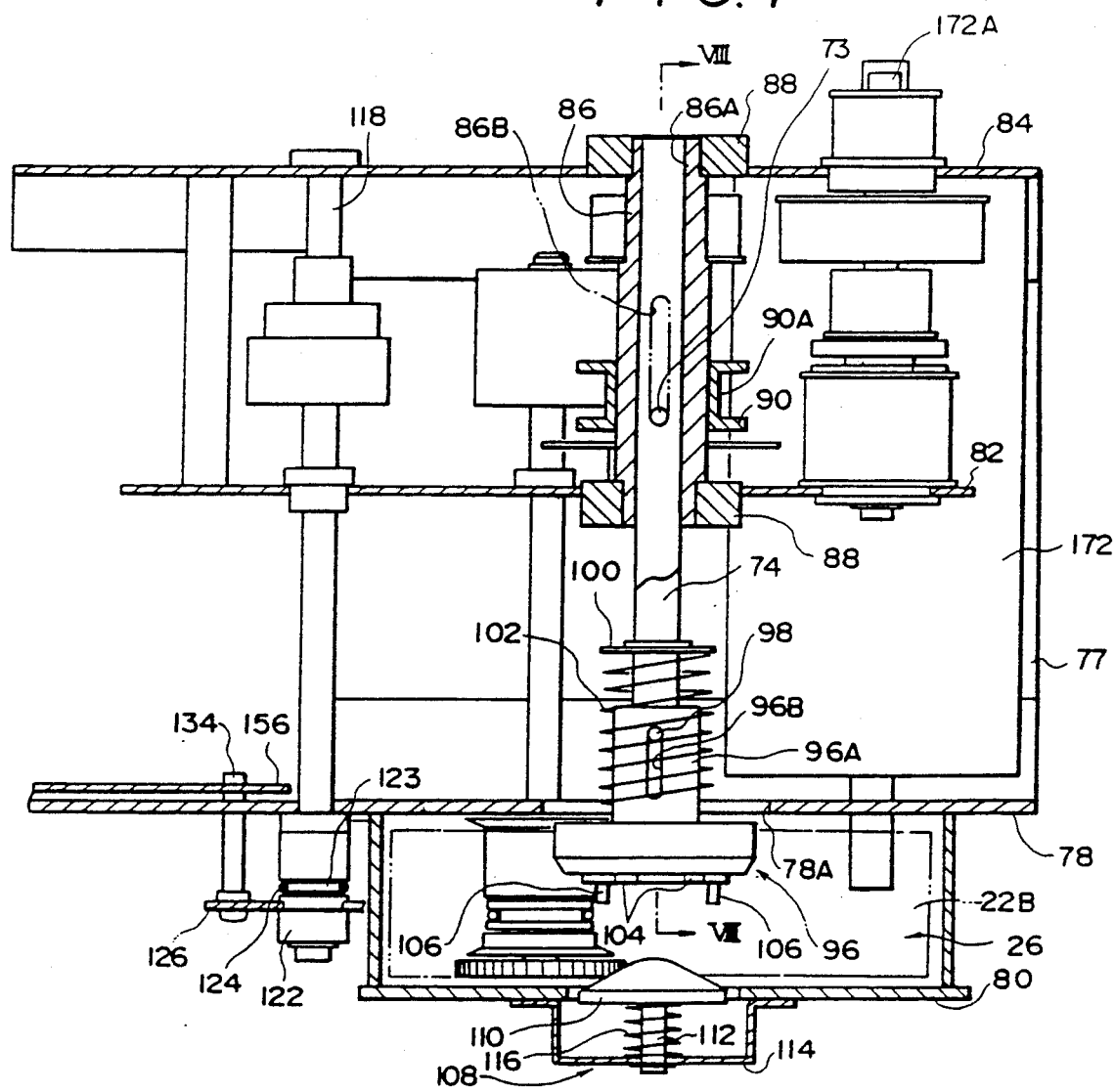
FIG. 7 is a sectional view taken along the line VII—VII of FIG. 6.

As shown in FIGS. 5 to 7, the loading part 26, in which cartridge 22B is loaded, is formed by a side plate 78 erectly provided on a base plate 77 and a side plate 80 provided on the side plate 78. A side plate 82 is also erectly provided on the base plate 77 on the rear side of the side plate 78 (on an upper side of FIG. 7), and a side plate 84 is erectly provided on the base plate 77 on the rear side of the side plate 82.

Reel shaft

As shown in FIGS. 7 and 8, both ends of a slide bearing 86 are respectively and rotatably supported by the side plates 82, 84 through bearings 88. The reel shaft 74 is inserted in the bearing part 86A of the slide bearing 86 and supported thereby so that it can be slid in the axial direction. A pin 73 is projected from the reel shaft 74 in the radial direction thereof, the top of the pin 73 being passed through the elongated hole 86B, which is provided on the slide bearing 86, and fixed by a flange 90 engaged on the external periphery of the slide bearing 86. A roller 91 mounted at one end of a lever 92 is inserted into the concave portion 90A of the flange 90 (refer to FIG. 5). The other end of the lever 92 is supported by the driving shaft 94A of a motor 94. When the motor 94 is driven, therefore, the lever 92 is rotated, and the flange 90 is moved in the axial direction of the slide bearing 86. The movement of the flange 90 causes the reel shaft 74 to be guided by the slide bearing 88 and moved in the axial direction.

The reel shaft 74 is connected to a driving shaft 172A of a supply motor 172 (refer to FIG. 7) supported by the side plate 84 by a transmission means (not shown) through a clutch (not shown) so as to be rotated by the driving force transmitted from the supply motor 172. The reel shaft 74 is rotated in the direction of normal rotation (shown by the arrow A of FIGS. 6 and 6A) and the direction of reverse rotation (shown by the arrow B of FIGS. 6 and 6A).

In addition, as shown in FIG. 8, one end of the reel shaft 74 is passed through the through hole 78A provided in the side plate 78 and projected therefrom, an abutting member 96 being mounted at the end so as to be movable in the axial direction of the reel shaft 74. Two elongated holes 96B are formed at equal intervals in the periphery of the neck 96A of the abutting member 96 in the axial direction thereof. Pins 98 projecting from the external periphery of the reel shaft 74 in the direction of separation from each other are respectively inserted into the elongated holes 96B.

A flange 100 is fixed at an intermediate portion of the reel shaft 74, and a compression coil spring 102 is interposed between the flange 100 and the abutting member 96. The abutting member 96 is thus urged toward the end of the reel shaft 74 by the urging force of the compression coil spring 102 (the position shown by solid lines in FIG. 8).

The head 96C of the abutting member 96 has a disk form having an outline which is formed so as to contact with the edges of the bottomed semicircular holes 66, 68 of the cartridge 22B. A magnet 104 is also provided in the front of the head 96C. The magnet 104 attracts the metallic disk 46 of the cartridge 22A when the cartridge 22A is loaded in the loading part 26 so as to ensure that the reel shaft 74 is connected to the cartridge 22A.

Two engagement pins 106 are provided at the front of the head 96C at equal intervals in the circumferential direction thereof so that they can be projected and retracted from the head 96C. The two engagement pins 106 are inserted into the bottomed semicircular holes 66, 68 of the cartridge 22B.

The abutting member 96 can be also used in the case of the cartridge 22A having a shape different from that of the cartridge 22B. Namely, the abutting member 96 abuts on the metallic disk 46 provided on the cassette reel 30 of the cartridge 22A so that the engagement pins 106 are inserted into the small holes 50. The cassette reel 30 is consequently connected to the reel shaft 74 so that the driving force transmitted to the reel shaft 74 from the supply motor 172 is transmitted to the cassette reel 30.

In addition, as shown in FIG. 7, a cartridge supporting part 108 is provided in an intermediate portion of the side plate 80, which forms the loading part 26, in correspondence with the end of the reel shaft 74. The cartridge supporting part 108 supports the rear side of the cassette reel 60 which is inserted into the loading part 26 and abuts against the abutting member 96. The cartridge supporting part 108 is constituted by a rear side abutting member 110 which abuts against the rear side of the cassette reel 60, a shaft 112 which rotatably supports the rear side abutting member 110, a plate 114 which supports the shaft 112 and a compression coil spring 116 interposed between the rear side abutting member 110 and the plate 114, the rear side abutting member 110 being urged to the rear side of the cassette reel 30 by the compression coil spring 116.

The cassette reel 60 in the cartridge 22B inserted into the loading part 26 is therefore held between the abutting member 96 at the end of the reel shaft 74 and the rear side abutting member 110.

Auxiliary arm

As shown in FIG. 7, a shaft 118, which is supported by the side plates 84, 82 and which is passed through the side plate 78, is disposed beside the reel shaft 74. The shaft 118 is connected to the driving shaft 172A of the supply motor 172 by a transmission means (not shown) through a clutch (not shown) so that the driving force is transmitted from the supply motor 172.

The end of the shaft 118, which is passed through the side plate 78, is provided with a pulley 123 and a roller 122 with a slight distance therebetween. An endless belt 124 is wound on the pulley 123. The pulley 123 is fixed to the shaft 118, while the roller 122 is rotatable relative to the shaft 118.

One end of an auxiliary arm 126 is supported by a portion of the roller 122 near the pulley 123. The auxiliary arm 126 is therefore rotatable around the shaft 118 at the center. A roller 128 having a groove provided in an intermediate portion in the axial direction of the roller 128 is rotatably supported at the other end of the auxiliary arm 126 by using a pin 127, as shown in FIGS. 5 and 6. The endless belt 124 which is wound on the roller 128 and the pulley 123 is received in the groove of the roller 128. This causes the rotational driving force of the supply motor 172 transmitted to the shaft 118 to be transmitted to the roller 128 through the endless belt 124 so that the roller 128 is rotated counterclockwise around the pin 127 serving as the center (in the direction shown by the arrow C in FIG. 6).

One end of a tension coil spring 130 is fixed to the upper end of the auxiliary arm 126. The other end of the tension coil spring 130 is fixed to a pin 132 which is erectly provided beside the auxiliary arm 126 (the left side of FIG. 6) on the side plate 78. The auxiliary arm 126 is thus urged counterclockwise around the shaft 118 at the center.

Further, as shown in FIG. 6, a convex portion 126A is provided in an intermediate portion of the auxiliary arm 126. A pin 134 is provided on the convex portion 126A so as to project toward the side plate 78, the end of the pin 134 abutting on the abutting part 156C of a moving plate 156 (refer to FIG. 6). When the moving plate 156 is moved toward the left side of FIG. 6A, the state of the auxiliary arm 126 shown by the solid lines in FIG. 6 wherein it is at an angle with respect to the vertical direction is changed to the substantially vertical state shown by the two-dot chain lines.

The position of the auxiliary arm 126 depends upon the kind of the cartridge 22 inserted into the loading part 26. For example, when the cartridge 22B is inserted into the loading part, the auxiliary arm 126 is inserted into the cartridge 22B through the slit 64 thereof, and the roller 128 abuts on the outermost layer of the microfilm 24 wound on the cassette reel 60.

When the cartridge 22A is inserted into the loading part 26, the abutting part 126B of the auxiliary arm 126 abuts on the side wall of the cartridge 22A and the auxiliary arm 126 assumes the substantially vertical state shown by the two-dot chain lines in FIG. 6A. In this state, the abutting part 126B provided on the auxiliary arm 126 projects from the tangent line between the roller 122 and the roller 128 toward the loading part 26 so as to prevent the roller 128 from abutting on the side wall of the cartridge 22A.

Driving arm

As shown in FIG. 6, a driving arm 136 is disposed beside the auxiliary arm 126. The driving arm 136 has a substantially L shape, one end of the L shape being rotatably supported by the side plate 78 by means of a pin 138. The other end is upwardly bent and provided with a driving roller 140, a pulley 142 and a separating claw 144.

As shown in FIGS. 6 and 7A, a torsion coil spring 146 is interposed between the pin 138 and the driving arm 136. One end of the torsion coil spring 146 abuts on the pin 150 erected from an intermediate portion of the driving arm 136 toward the side plate 78, the other end being fixed by a pin (not shown) provided on the side plate 78. The driving arm is consequently urged in the counterclockwise direction around the pin 138 at the center. The end of the driving arm 136 is thus inserted into the loading part 26. When the cartridge 22B is inserted into the loading part 26, the roller 140 is inserted into the cartridge 22B through the opening 62 and abuts on the outermost layer of the microfilm 24 in the cartridge 22B.

The pin 150 is passed through the through hole 78C provided in the side plate 78 and outwardly projected, as shown in FIGS. 6A and 7A, and inserted into the rectangular through hole 156A (refer to FIG. 5) of the moving plate 156 which is arranged in parallel to the rear side of the side plate 78.

An elongated hole 136A having a circular arc form is provided in an intermediate portion of the driving arm 136. In the elongated hole 136A is inserted a pin 148 erected on the side plate 78 toward the driving arm 136. When the driving arm 136 is rotated around the pin 138, the pin 148 is relatively moved in the elongated hole 136A.

The moving plate 156 disposed on the rear side of the side plate 78 (the upper side of FIG. 7A) is provided with three elongated holes 156B (refer to FIG. 5). In the elongated holes 156B are respectively inserted guide pins 151 erectly provided on the side plate 78. The guide pins 151 cause the moving plate 156 to be guided in the lateral direction of FIG. 6A.

As shown in FIG. 7A, a rotational shaft 153 is supported to the side plate 78 erectly from on the rear side thereof. One end of the swing lever 152 is fixed to the end of the rotational shaft 153. The other end of the swing lever 152 is supported by the pin 157 eccentrically provided on a disk cam 154. The disk cam 154 is fixed to the driving shaft 155A of a motor 155. The swing lever 152 has a slot 152A formed in an intermediate portion thereof. In the slot 152A is inserted a pin erectly provided on the moving plate 156. When the swing lever 152 is rotated counterclockwise around the rotational shaft 153 by the operation of the motor 155 through the disk cam 154, the moving plate 156 is moved to the left side of FIG. 6A though the pin 159. The movement of the moving plate 156 causes the clockwise oscillation of the driving arm 136 around the pin 138 against the urging force of the torsion coil spring 146 through the pin 150. The driving roller 140 is consequently separated from the outermost layer of the microfilm 24 in the cartridge 22B.

In this case, since the driving arm 136 is urged counterclockwise around the pin 138 serving as a center by the torsion coil spring 146, the driving arm 136 is placed at the position shown by the solid lines in FIG. 6, i.e., the end of the driving arm 136 is inserted into the loading part 26, the moving plate 156 being moved to the position shown by the chain lines in FIG. 6A. In this state, the driving roller 140 can be inserted into the loading part 26 through the opening 62 of the cartridge 22B loaded therein.

In addition, a pulley 164 is provided at a position at a given lengthwise distance from the pulley 142 adjacent to the driving roller 140 of the driving arm 136, an endless belt 166 being wound on the pulleys 142 and 164.

The pulley 142 is connected to the driving roller 140 through a gear (not shown) so as to transmit rotational driving force to the roller 140 and rotate it in the direction reverse to the pulley 142. The endless belt 166 is also wound on a driving pulley 168 between the pulleys 142 and 164.

Driving roller

The driving pulley 168 is fixed to a driving shaft 170 rotatably supported by the side plate 78, as shown in FIG. 9. The driving shaft 170 is connected to the driving shaft of a supply motor 172 by a connection means (not shown). A one-way clutch is interposed between the supply motor 172 (refer to FIGS. 6 and 7) and the connection means (not shown) so as to be operated as occasion demands. Namely, the clutch transmits and cuts off the rotational driving force of the supply motor 172 to the driving shaft. When the driving shaft 170 is rotated in the counterclockwise direction in FIG. 6 (the direction shown by the arrow D in FIG. 6) by the driving force transmitted from the supply motor 172, the driving pulley 168 is rotated clockwise in FIG. 6. The rotation of the driving pulley 168 causes the movement of the endless belt 166 and the rotation of the pulleys 164, 142 in the clockwise direction in FIG. 6. The rotation of the pulley 142 is transmitted through a gear (not shown) to the driving roller 140 which is thus rotated in the counterclockwise direction in FIG. 6.

Separating claw

The separating claw 144 having a top placed above the driving roller 140 is rotatably supported by the driving arm 136 through a fixing pin 143, as shown in FIGS. 6 and 6A. In the separating claw 144, a torsion coil spring 145 is mounted around the fixing pin 143 so that the top of the release claw 144 is pressed on the outermost layer of the microfilm 24 wound on the cassette reel 60 by the urging force of the torsion coil spring 145 at the position where the driving roller 140 abuts on the outermost layer of the microfilm 24 of the cassette reel 60. The separating claw 144 is used for releasing the end of the microfilm 24 from the portion of the cassette reel 60 on which the microfilm 24 is wound. The center of the rotation of the release claw 144 is so set that the release claw 144 is always at a substantially constant angle with respect to the tangent line at the position where it abuts on the portion of the cassette reel 60 on which the microfilm 24 is wound, regardless of the diameter of the portion of the cassette reel 60 on which the microfilm 24 is wound.

The separating claw 144 separates the end of the microfilm 24 wound on the cassette reel 60 and then abuts on the end of the microfilm 24 which is thus guided downward.

The release claw 144 is divided at an intermediate position into a release part 144A for separating the end of the microfilm 24 and a guide part 144B for downwardly guiding the end of the microfilm 24 after separation, both parts having different widths. The width of the separating part 144A is smaller than that of the guide part 144B, in this embodiment, the widths of the separating part 144A and the guide part 144B being 2 mm and 5 mm, respectively. The separating part 144A of the separating claw 144 has the form of a circular arc with a radius of curvature which is half or less of the thickness of the microfilm 24. In this embodiment, the end of the separating claw 144 has the form of a circular arc with a radius of curvature of 30 μm relative to the thickness of 60 μm of the microfilm 24.

Carrying arm

On the other hand, as shown in FIG. 9, free rollers 174, 176 are rotatably supported by the driving shaft 170 with a driving pulley 168 therebetween. The diameter of each of the free rollers 174, 176 is so set that the endless belt 166 wound on the driving pulley 168 does not project from the outer periphery of each of the free rollers 174, 176. A gear 178 is fixed to the end of the driving shaft 170 so as to engage with a gear 180.

The gear 180 is rotatably supported by the end of a moving shaft 182. The moving shaft 182 is passed through the elongated hole 78B provided in the side plate 78, a carrying arm 184 being fixed to the other end of the moving shaft 182 (refer to FIG. 5).

The carrying arm 184 is rotatably supported at its one end by the side plate 82 through a pin 186. The carrying arm 184 has an elongated hole 184A formed below the moving shaft 182, a guide pin 188 projected from the rear side of the side plate 78 being inserted into the elongated hole 184A. The carrying arm 184 is also connected to the driving shaft 190A of a solenoid 190 by a shaft 192 at a position below the elongated hole 184A. The end of the shaft 192 is inserted into the elongated hole 78C formed in the side plate 78. One end of an tension coil spring 194 is fixed to an intermediate position of the carrying arm 184. The other end of the tension coil spring 194 is fixed to a pin (not shown) erectly provided on the side plate 82.

When the solenoid 190 is not actuated, therefore, the carrying arm 184 is urged in the counterclockwise direction in FIG. 6 by the urging force of the tension coil spring 194 so that the shaft 192 abuts on one end of the elongated hole 78C (the right end in FIG. 6). When the solenoid 190 is actuated, the driving shaft 190A is moved against the urging force of the tension coil spring 194 so that the carrying arm 184 is rotated around the pin 186 in the counterclockwise direction in FIG. 6. As a result, the gear 180 engages with the gear 178.

As shown in FIG. 9, a carrying roller 196 having a groove in an intermediate portion thereof is rotatably supported by the moving shaft 182 between the side plate 78 and the gear 180. The carrying roller 196 abuts on the outer periphery of each of the free rollers 174, 176 when the gear 178 is engaged with the gear 180, as shown in FIG. 9. At the same time, the carrying roller 196 is also rotated in abutment on the free rollers 174, 176. The microfilm 24 guided by the separating claw 144 is inserted into the portion between the free rollers 174, 176 and the carrying roller 196 and carried while being held therebetween.

Common guide

An endless belt 198 is inserted into the groove provided in an intermediate portion of the carrying roller 196 and wound on a film damage preventing roller 200 (refer to FIG. 5) disposed above the carrying roller 196. The film damage preventing roller 200 is rotatably supported by a shaft 204 projected from a common guide 202. This causes the rotational force of the carrying roller 196 to be transmitted to the film damage preventing roller 200 through the endless belt 198 so as to rotate it.

The common guide 202 has a guide part 202A, which is bent so as to close the space between the film damage preventing roller 200 and the lower surface of the cartridge 22B loaded in the loading part 26, as shown in FIGS. 5 and 6. A guide 206 is also mounted on the common guide 202 beside the film damage preventing roller 202 for the purpose of restricting the carriage path of the film in the widthwise direction.

The microfilm 24, which is discharged from the cassette reel 30, is therefore inserted into the space between the endless belt 166 and the free rollers 174, 176 and the carrying roller 196 while being guided by the film damage preventing roller 200 and the common guide 202.

When the cartridge 22A is loaded into the loading part 26, no gap occurs between the film damage preventing roller 200 and the bottom of the cartridge 22A, while when the cartridge 22B is loaded, a gap occurs therebetween. Although the end of the microfilm 24 has a tendency to enter the gap, it is possible to prevent the end of the microfilm 24 from entering the gap because the guide part 202A of the common guide 202 can close the gap. The common guide 202 may be disposed in a lower portion of the loading part 26 so that, when the cartridge 22A is loaded, the guide part 202A of the common guide 202 is inserted into the notch (not shown) provided at the bottom of the cartridge 22A.

Flange roller

As shown in FIGS. 5 and 6, a flange roller 208 is disposed below the driving arm 136. A guide plate 210 is also disposed below the flange roller 208 and the free rollers 174, 176. The microfilm 24 discharged from the cassette reel is guided and carried onto the guide plate 210.

A flange roller 214 having a diameter smaller than that of the flange roller 208 is disposed between the flange roller 208 and the take-up reel 28. The upper portion of the flange roller 214 is placed above the end of the guide plate 210. The microfilm 24 guided to the guide plate 210 is thus sent onto the flange roller 214. During the carriage of the microfilm 24, the widthwise movement of the microfilm 24 is restricted by the flanges 208A and 214A which are formed on the flanges 208 ad 214, respectively. Since the microfilm 42 is guided by the flanges 208A and 214A, the microfilm 24 is not inclined and moved in the widthwise direction from the center of the flange roller 208.

A guide roller 216 is disposed downstream of the flange roller 214 in the direction of carriage of the microfilm 24. The guide roller 216 is placed at the same height as the flange roller 214 having a small diameter so that the microfilm 24 is substantially horizontally carried in a state wherein it is supported by the flange roller 214 and the guide roller 216. A guide roller 220 is also disposed above the guide roller 216.

The angle of contact of the microfilm 24 with each of the flange rollers 208 and 214 is set to at least 10°.

Take-up reel

Figure 4:
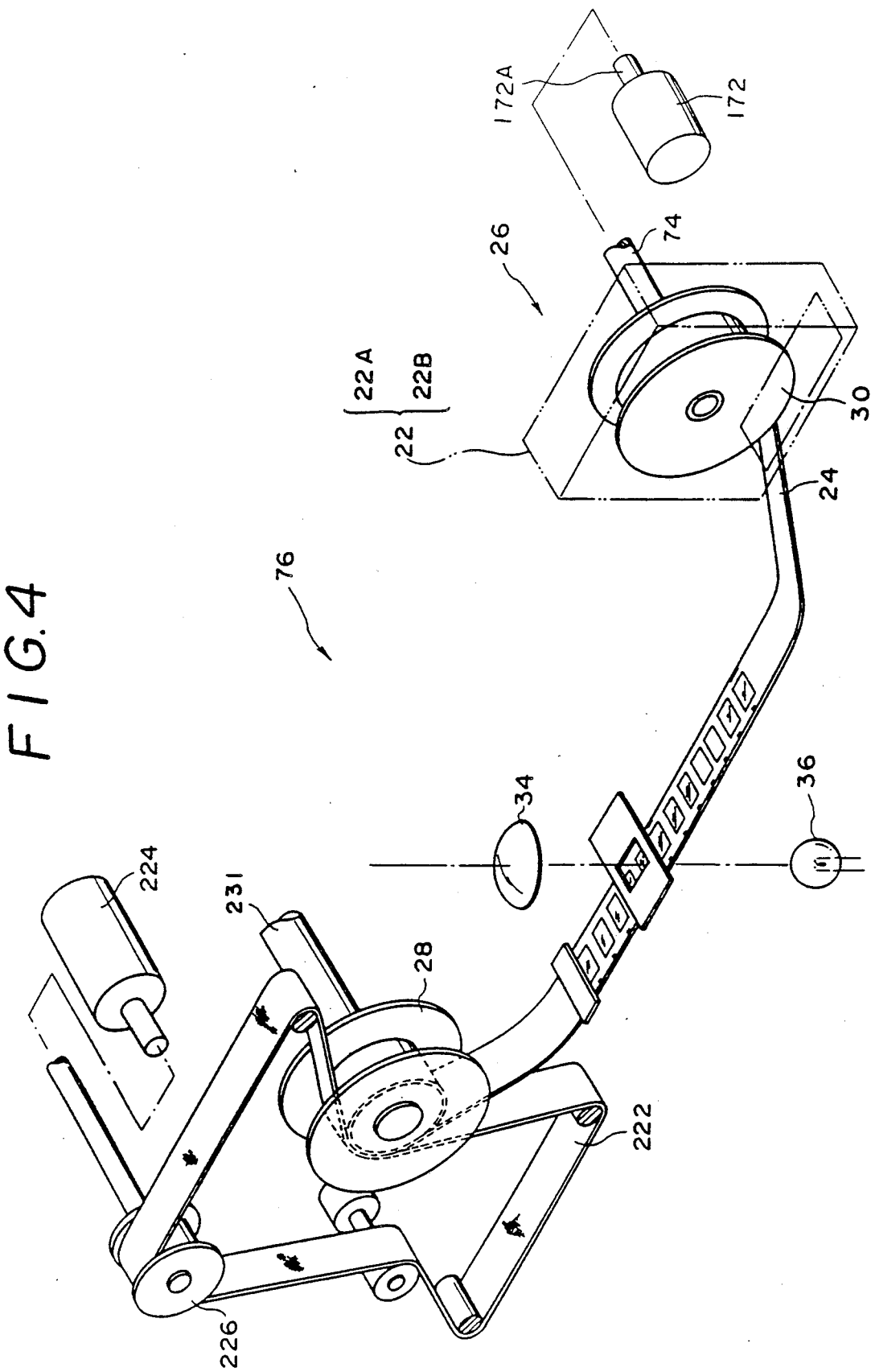
FIG. 4 is a perspective view of a loading driving system and a retrieval driving system.

As shown in FIG. 4, the take-up reel 28 is rotated by the carriage of an endless belt 222 whose outside contacts with the microfilm taking-up part. The microfilm 24 is inserted into the space between the endless belt 222 and the microfilm take-up part. The endless belt 222 is wound around a driving roller 226 which is rotated by the driving force of the take-up motor 224 and carried by the driving force of the take-up motor 224 so as to rotate the take-up reel 28. At the same time, the take-up reel 28 is constantly pressed toward its axis by the endless belt 222.

Figure 10:
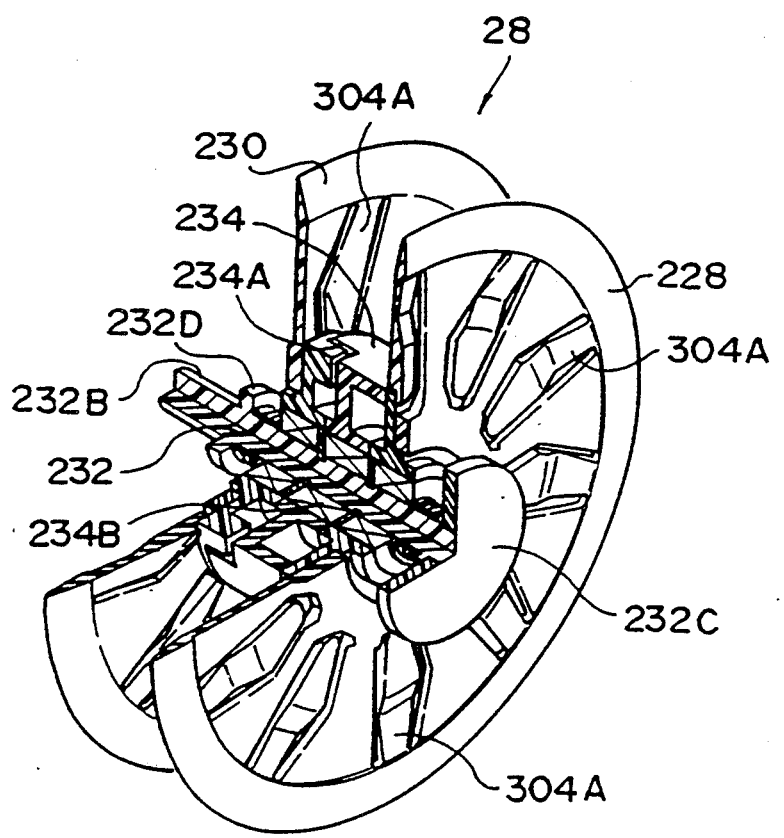
FIG. 10 a partially cut-away perspective view of a take-up reel.
Figure 11:
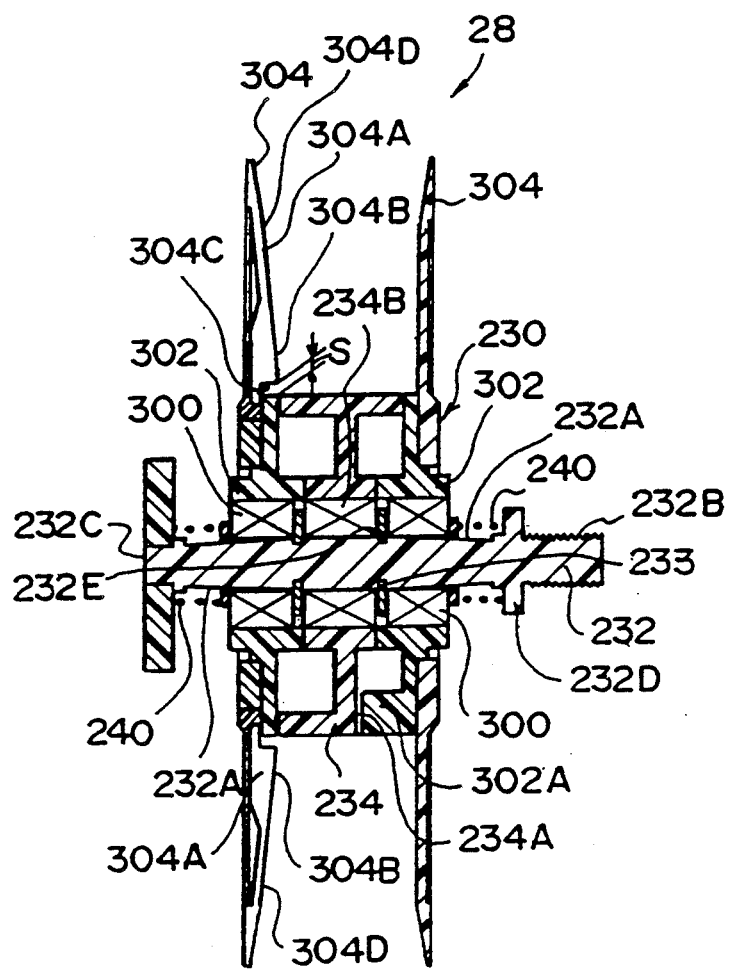
FIG. 11 is a sectional view of the take-up reel.

The take-up reel 28 is described in detail below with reference to FIGS. 10 and 11.

The take-up reel 28 comprises a fixation shaft 232; a take-up member 234 which is rotatably supported by an intermediate portion of the fixation shaft 232 in the lengthwise direction thereof and which has an outer periphery on which the microfilm 24 is wound, and two disks 228 and 230 which are opposed to each other with the take-up member 234 therebetween and which are rotatably supported by the fixation shaft 232 so as to be movable along the lengthwise direction thereof. The take-up reel 28 further comprises two compression coil springs 240 for urging the disks 228 and 230 from both ends of the fixation shaft 232 in the direction of approach to each other.

The fixation shaft 232 has portions 232A which are tapered in such a manner that the diameter of the fixation shaft 232 is gradually reduced from the center toward both ends thereof in the lengthwise direction thereof for rotatably supporting the disks 228, 230. The disks 228, 230 are thus oscillatable around the tapered portions 232A serving as a center in the lengthwise direction. The fixation shaft 232 has a screw part 232B formed on the outer periphery at one end. The other end of the fixation shaft 232 is applied for fixation of an operational disk 232C for screwing the screw part 232B. The fixation shaft 232 can be therefore fixed to a shaft member 231 (refer to FIG. 4) projected from a side plate (not shown), by a rotational operation of the operational disk 232C, through a screw hole (not shown) formed at the end of the shaft member 231. It is to be noted that the operational disk 232C is fixed to the fixation shaft 232 in a final step of assembling the take-up reel 28. The fixation shaft 232 is further provided with a flange part 232D between the screw part 232B and the tapered portion 232A on the side of the screw part 232B for the purpose of supporting one end of the compression coil spring 240.

The fixation shaft 232 is also provided with ring-like grooves 233E opposed to both the ends of the take-up member 234, and an E-ring 233, which serves to position the take-up member 234 on the fixation shaft 232, is fitted in each of the grooves 233E.

The take-up member 234 has a plurality of zigzag concave portions 234A which are formed in the wall thereof at both axial ends at predetermined intervals along the peripheral direction. The zigzag portions 234A are used for engaging the take-up member 234 with the disks 228, 230 and positioning it between the disks 228, 230. The take-up member 234 is also provided with the bearing 234B which is fixed at the center thereof and in which the fixation shaft 232 is inserted so that the take-up member 234 is smoothly rotated around the fixation shaft 232.

The disk 228 comprises a bearing 300 in which the fixation shaft 232 is inserted, a disk-shaped base 302 which is fixed on the outer periphery of the bearing 300 and which has the same external diameter as that of the take-up member 234, and a disk 304 which is fixed to one side of the disk-shaped base 302 and which has a diameter larger than that of the disk-shaped base 302. The disk-shaped base 302 has a plurality of convex portions 302A which are provided along the periphery of the other side so as to engage with the concave portions 234A of the take-up member 234. The disk 304 has a plurality of elongated projecting portions 304A each of which has one end supported near the outer periphery of the disk 304 and extends to the disk-shaped base 302 and which are provided along the periphery at predetermined distances. Each of the projecting portions 304A is gradually projected toward the disk-shaped base 302 from the base end to the top so as to have an inclined surface 304B. The side at the projection top of each of the projection portions 304A has a notched step portion 304C in which the angular portion at the periphery of the disk-shaped base 302 is received. A gap S greater than the thickness of the microfilm 24 is formed between the peripheral side surface of the disk-shaped base 302 received in the step potion 304C and the surface of the step portion 304C opposing the peripheral side surface. Each of the projecting portions 304A has a thin portion 304D which is formed from the base end to substantially the center in the lengthwise direction so that the performance of each of the projecting portions as a spring can be improved. Since the disk 230 has substantially the same structure as that of the described-above disk 228, it is not described below.

The take-up reel 28 comprises an assembly of the members each configured as described above. In the assembled take-up reel 28, the disks 228, 230 are urged by the compression coil springs 240 in the direction of approach to each other, and the convex portions 302A are respectively inserted into the concave portions 234A of the take-up member 234. The disks 228, 230 and the take-up member 234 are therefore connected to each other around the fixation shaft 232 and integrally rotated around the fixation shaft 232. In this state, the positional relationship in the peripheral direction between the convex portions 302A of each of the disks 228 and 230 and the concave portions 234 of the take-up member 234 is so set that the projecting portions 304A of the disk 228 are respectively placed between the adjacent projecting portions 304A of the opposite side of the disk 230.

A description will now be given of a case where the microfilm 24 is wound on the take-up reel 28 having the above-mentioned structure and has fixed to the shaft member 231 (refer to FIG. 4) through the screw part 232B of the fixation shaft 232. When the end of the microfilm 24 is inserted into the space between the disks 228 and 230, it is held between the projecting portions 304A at both widthwise ends with the aid of the urging force of the compression coil springs 240. At the same time, the disks 228, 230 and the take-up member 234 are rotated around the fixation shaft 232 owing to the moving force of the microfilm 24, and the microfilm 24 is pressed on the take-up member 234 by the endless belt 222. This pressure causes the disks 228, 230 to be oscillated around the tapered portions 232A of the fixation shaft 232 serving as a center in the direction in which the portions for holding the microfilm 24, i.e., the projecting portions 304A, are separated from each other. As a result, the end of the microfilm 24 abuts on the outer periphery of the take-up member 234, and both widthwise ends at the end are respectively inserted into and fitted in the gaps S between the peripheral sides of the disk-shaped base 302 and the surfaces of the step portions 304C opposite to the peripheral sides. The microfilm 24 is then wound on the take-up member 234 while being held between the projecting portions 304A of the disks 228, 230 and pressed by the endless belt 222.

As described above, since the fixation shaft 232 of the take-up reel 28 has the tapered portions 232A as the portions for rotatably supporting the disks 228, 230, the disks 228, 230 are smoothly oscillated when the end of the microfilm 24 is pressed by the endless belt 222 so that the end can be certainly inserted into the gaps S. Since the disks 228, 230 of the take-up reel 28 are also urged by the compression coil spring 240 so that the distance between the disks 228, 230 can be increased and reduced, the microfilm 24 can be wound on the take-up reel 28 regardless of the width of the microfilm 24.

Detector

In the loading driving system for the microfilm 24 configured as described above, a first detector 212 is interposed between the flange roller 208 and the free rollers 174, 176, as shown in FIG. 6. The first detector 121 detects the presence of the microfilm 24 passing between the flange roller 208 and the free rollers 174, 176.

A third detector 218 is disposed between the guide roller 216 and the flange roller 214 in correspondence with the both widthwise ends of the microfilm 24. The third detector 218 detects the blip mark which is provided both widthwise ends of the microfilm 24 corresponding to the position of each image on the microfilm so that the position of a desired image can be retrieved when the desired image is retrieved. In addition, since the widthwise position of the microfilm 24 is restricted by the flange rollers 208, 214, the mark can be surely detected. Further, since the microfilm 24 is constantly moved to a portion at the same distance from the third detector 218 owing to the arrangement of the flange roller 208, the flange roller 214 and the guide roller 216, the blip marks on the microfilm can be surely detected. The first detector 212 and the third detector 218 are connected to a controller 242.

A light source 36 is disposed downstream of the guide roller 220 for the purpose of applying light to the images recorded on the microfilm 24, a lens 34 being disposed above the light source 36.

In addition, a second detector 213 having the same structure as that of the first detector 212 is disposed below the carriage path of the microfilm 24 downstream of the light source 36. The second detector 213 is also connected to the controller 242.

Figure 12:
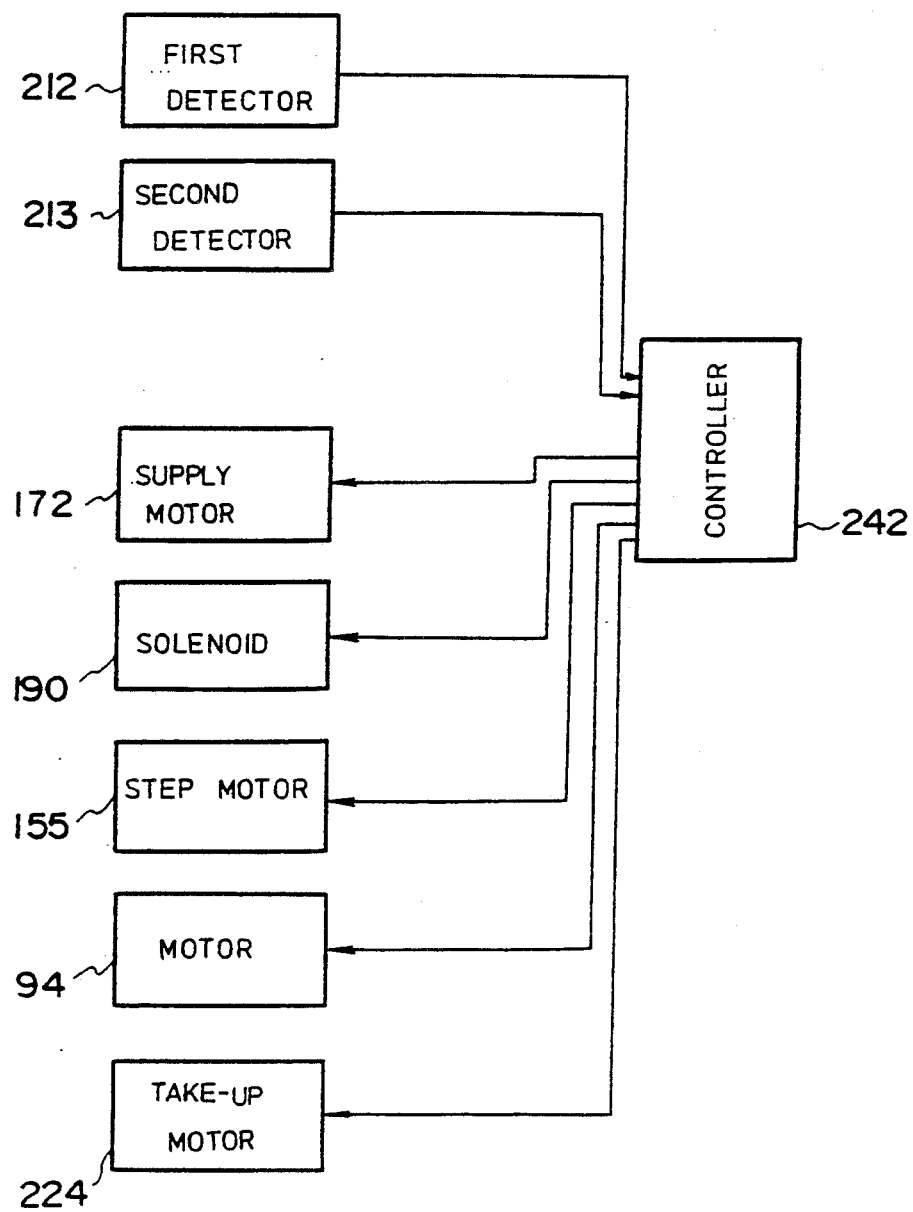
FIG. 12 is a block diagram which shows a relation between a controller and other units.

To the controller 242 are connected the supply motor 172, the solenoid 19,, the motor 155, the motor 94 and the take-up motor 224 so that the operation of each of the members is controlled, as shown in FIG. 12.

The retrieval driving system is described below.

As described above, the take-up reel 28 is rotated by the endless belt 222 carried by the take-up motor 224 so that the microfilm 24 is wound on the portion between the endless belt 222 and the take up member 234.

On the other hand, the driving force is transmitted from the supply motor 172 to the cassette reel 60 which is urged in the direction of winding of the microfilm 24 on the cassette reel 60. The microfilm 24 is therefore maintained in a state wherein tension is applied to the microfilm 24 from the supply motor 172 and the take-up motor 224.

In this state, a desired image can be retrieved from the images recorded on the microfilm 24 by winding the microfilm 24 to the take-up reel 28 and rewinding the microfilm 24 on the cassette reel 30.

The operation of this embodiment is described below with reference to the timing chart shown in FIG. 13.

A description will be first given of a case where the cartridge 22B is loaded in the loading part 26, and then a case where the cartridge 22A is loaded therein.

The auxiliary arm 126 of the loading part 26 in which the cartridge 22B is loaded is maintained in a vertical state by the moving plate 156, as shown by the two-dot chain lines in FIG. 6. The driving arm 136 is maintained in the position shown by the two-dot chain line in FIG. 6 by the moving plate 156 against the urging force of the torsion coil spring 146.

In this state, when the cartridge 22B is loaded in the loading part 26, the loading is detected by a detector (not shown). In this state, the rear side abutting member 110 abuts on the cartridge 22B by the urging force of the compression coil spring 116, and the cartridge 22B is pressed toward the side plate 78 by the compression coil spring 116. When the loading of the cartridge 22B in the loading part 26 is detected by the detector (not shown), in the state wherein the cartridge 22B is pressed toward the side plate 78, the motor 94 is driven so as to project the reel shaft 74 from the through hole 78A of the side plate 78 (position A shown in FIG. 13). The head 106 of the abutting member 96 of the reel shaft 74 projecting from the through hole 78A abuts on the edges of the bottomed semicircular holes 66, 68.

After a predetermined time (between positions A and B in FIG. 13) has passed, the supply motor 172 is reversely rotated, and the driving force of the supply motor 172 is transmitted to the reel shaft 74 by the transmission means (not shown) (position B shown in FIG. 13). The driving force causes the reel shaft 74 to be rotated in the counterclockwise direction in FIG. 6 and the cassette reel 60 to be rotated in the same direction so as to start the winding of the microfilm 24.

The rotation of the cassette reel 60 causes the engagement pins 106 to be respectively certainly inserted into the bottomed semicircular holes 66, 68. In an engaged state wherein the engagement pins are respectively inserted into the bottomed semicircular holes 66, 68, the cartridge 22B is held between the rear side abutting member 110 and the abutting member 96 owing to the urging force of the compression coil springs 110 and 116.

After a predetermined time (between positions B and C in FIG. 13) has passed, the drive of the motor 155 is started (position C in FIG. 13). The drive of the motor 155 causes the disk cam 154 to be rotated around the rotational supporting shaft 153 in the clockwise direction in FIG. 6A so as to move the moving plate 56 toward the right side in FIG. 6A. This causes the auxiliary arm 126 to be inserted into the cartridge 22B through the slit 64 provided in the side wall of the cartridge 22B, as well as causing the driving arm 136 to be inserted therein through the opening 62, so that the roller 128 and the driving roller 140 abut on the outermost layer of the microfilm 24. At the same time, the separating claw 144 also abuts on the outermost layer of the microfilm 24.

After a predetermined time (between positions C and D in FIG. 13) has passed, when the carrying arm is swung owing to the actuation of the solenoid 190, the gear 178 is engaged with the gear 180, and the carrying roller 196 abuts on the free rollers 174, 176. When the reverse rotation of the reel shaft 74 is then stopped, the winding of the microfilm 24 is stopped. In this way, the microfilm 24 is wound in the cartridge 22B.

At the same time, the driving force is transmitted from the supply motor 172 to the shaft 118 by a clutch (not shown) (position D in Dig. 13) so as to rotate the pulley 123, carrying the endless belt 124 and rotate the roller 128 in the counterclockwise direction in FIG. 6 (in the direction shown by the arrow C in the drawing). The driving force is also transmitted from the supply motor 172 to the driving shaft 170 by a clutch (not shown) so as to rotate the driving pulley 168 in the clockwise direction in FIG. 6 (in the direction shown by the arrow D in the drawing), carrying the endless belt 166 and rotate the pulley 142. When the pulley 142 is rotated, the driving roller 140 is rotated in the counterclockwise direction in FIG. 6 by a gear (not shown). The discharge of the microfilm 24 is thus started in the direction shown by the arrow A in FIG. 4. In this state, since the driving force is transmitted to the free rollers 174, 176 from the supply motor 172 through a clutch (not shown), the free rollers 174, 176 and the carrying roller 196 wait for the insertion of the microfilm 24 while being rotated.

After a predetermined time (between positions D and E in FIG. 13) has passed, the reel shaft 74 is normally rotated, and the discharge of the microfilm 24 from the cartridge 22B is started by the driving force of the supply motor 172 (position E in FIG. 13).

On the other hand, the end of the microfilm 24 wound on the cassette reel 60 sometimes adheres to the outermost layer owing to static electricity or insufficient drying. In this embodiment, therefore, the top of the separating claw 144 abuts on the outermost layer of the microfilm 24 together with the roller 128 and the driving roller 140. When the microfilm 24 is rotated by the driving force of the roller 128 and the driving roller 140, the end of the microfilm 24 is thus guided to a lower part of the loading part 26 by the guide part 144B of the separating claw 144 and is further guided by the film damage preventing roller 200 and the guide part 202A of the common guide 202 to be inserted into the space between the free rollers 174, 176 and the carrying roller 196 (positions E to F in FIG. 13). The microfilm 24 inserted into the space between the free rollers 174, 176 and the carrying roller 196 is sent onto the guide plate 210.

When the microfilm 24 discharged from the cartridge 22B is sent onto the guide plate 210, the end of the microfilm 24 is detected by the first detector 212 (position F in FIG. 13).

When the microfilm 24 is detected by the first detector 212, the motor 155 is driven so that the moving plate 156 is moved to the left side in FIG. 6. The movement of the moving plate 156 causes the driving arm 136 and the auxiliary arm 126 to be extracted from the cartridge 22B. The take-up reel 28 is then driven by the endless belt carried by the take-up motor 224 (position G in FIG. 13) and waits for the arrival of the end of the microfilm 24.

When the discharge of the microfilm 24 from the cartridge 22B is confirmed by the first detector 212, the end of the microfilm 24 is guided by the guide 210 and wound on the flange roller 208. After the microfilm 24 has been wound on the flange roller 208, the end of the microfilm 24 is wound on the flange roller 214 having a small diameter and then wound on the guide roller 216. After the microfilm 24 has been wound on the guide roller 216, the end of the microfilm 24 is wound on the guide roller 220. The passage of the microfilm 24 is first detected by the first detector 212 is then detected by the second detector 213. The end of the microfilm 24 is then sent on the outer periphery of the take-up member 234 of the take-up reel 28, pressed by the endless belt 222 and held between the projecting portions 228A, 230A and the take-up member 234, whereby the microfilm 24 is successively wound on the take-up member 234.

When the microfilm 24 is detected by the second detector 213 (position H in FIG. 13), after a predetermined time has passed, the actuation of the solenoid 190 is stopped, and the normal driving of the supply motor 172 is then stopped.

In this state, although the take-up reel 28 has a tendency to rotate owing to the driving force of the take-up motor 224, the microfilm 24 is stopped because the discharge from the cassette reel 60 is stopped. After a predetermined time has passed, the take-up motor 224 is stopped, and the microfilm 24 is brought into a retrieval state. In this state, the loading is completed.

A description will not be given of the loading of the cartridge 22A in the loading part 26.

When the cartridge 22A is loaded in the loading part 26, the motor 155 is driven so as to rotate the disk cam 154. This rotation causes the moving plate 156 to be moved to the right side in FIG. 6. However, since no slit is provided in the side wall of the cartridge 22A, the abutting part 126B of the auxiliary arm 126 abuts on the side wall of the cartridge 22A. The roller 128 is thus pressed by the side wall of the cartridge 22A so that the auxiliary arm 126 is in a substantially vertical state, as shown in FIG. 6. At the same time, since the abutting member 126B abuts on the side wall of the cartridge 22A, the roller 128 does not abut on the side wall of the cartridge 22A.

The driving arm 136 is operated in the same way as in the cartridge 22B so as to be inserted into the cartridge 22A through the opening 44.

In the case of the cartridge 22A, therefore, the end of the microfilm 24 is delivered by the driving roller 140 and the carrying roller 196.

A description will now be given of a case where a desired image is retrieved from the images recorded on the microfilm 24.

When the turn of a blip mark corresponding to a desired image is specified, the cassette reel 60 is rotated by drive of the supply motor 172 so that the microfilm 24 is rewound on the cassette reel 60 and the take-up reel 28 is rotated by drive of the take-up motor 224 so that the microfilm 24 is wound on the take-up reel 28, whereby the desired image can be retrieved by detecting the blip mark corresponding to the desired image by the third detector.

What is claimed is:

1. A microfilm retrieval apparatus for retrieving a desired image from images recorded on a microfilm by winding a microfilm, which is wound on a cassette reel, on a take-up reel after one end of said microfilm has been wound on said take-up reel and held thereby, and rewinding said microfilm on said cassette reel, said take-up reel comprising:

two disks;

a take-up shaft which rotatably supports said two disks so that said two disks are opposed to each other and can be moved in the direction of separation from each other and which has an outer periphery on which said microfilm is wound between said two disks, portions of said take-up shaft, which rotatably support said two disks, being tapered in such a manner that the diameter of said take-up shaft is gradually reduced from the center to both ends thereof in the lengthwise direction so that said two disks can be oscillated in the direction of separation from each other at the start of winding of said microfilm; and holding means which are provided on the opposite surfaces of said two disks so as to project in the direction of approach to each other for the purpose of holding said microfilm by pressing the widthwise ends of said microfilm wound on said take-up shaft.

2. A microfilm retrieval apparatus according to claim 1, wherein said take-up shaft includes a take-up member which constitutes a part of the outer periphery of said take-up shaft and is disposed between said two disks and which is rotated together with said two disks so as to wind said microfilm on the outer periphery thereof.

3. A microfilm retrieval apparatus according to claim 2, wherein said take-up reel further comprises urging means for urging said two disks toward each other.

4. A microfilm retrieval apparatus according to claim 3, wherein convex portions are provided in the lengthwise direction on said two disks or said take-up member, and concave portions in which said convex portions are respectively extractably received are provided in the other of said two disks or said take-up member.

5. A microfilm retrieval apparatus according to claim 4, wherein said holding means comprise projecting elastic members each of which is supported at one end in the vicinity of the periphery of each of said disks and extended in the axial direction thereof.

6. A microfilm retrieval apparatus according to claim 5, wherein the other end of each of said projecting member is provided with a recess for receiving each of the widthwise ends at one end of said microfilm.

7. A microfilm retrieval apparatus according to claim 6, wherein each of said projecting members on one of said disks has an inclined surface which gradually approaches the other disk so that the widthwise ends of said microfilm are pressed by said inclined surfaces.

8. A microfilm retrieval apparatus according to claim 7, wherein a plurality of said projecting members are provided at predetermined intervals along the periphery of each of said disks.

9. A microfilm retrieval apparatus according to claim 8, wherein said two disks are positioned relative to said take-up member so that said projecting members on one of said disks are respectively opposed to the spaces between said adjacent projecting members on the other disk.

10. A microfilm retrieval apparatus for retrieving a desired image from images recorded on a microfilm by winding a microfilm, which is wound on a cassette reel, on a take-up reel after one end of said microfilm has been wound on said take-up reel and held thereby, and rewinding said microfilm on said cassette reel, said take-up reel comprising:

two disks;

a shaft member which rotatably supports said two disks so that said two disks are opposed to each other and can be moved in the direction of separation from each other, portions of said shaft member, which rotatably support said two disks, being tapered in such a manner that the diameter of said shaft member is gradually reduced from the center to both ends thereof in the lengthwise direction so that said two disks can be oscillated in the direction of separation from each other;

a take-up member rotatably supported by said shaft member between said two disks for the purpose of winding said microfilm on its outer periphery;

urging means for urging said two disks in the direction of approach to each other so as to maintain said two disks and said take-up member in a state wherein they engage with each other with respect to rotation of said two disks and said take-up member around said shaft member; and holding means which are provided on the opposite surfaces of said two disks so as to project in the direction of approach to each other for the purpose of holding said microfilm by pressing the widthwise ends of said microfilm wound on said take-up member using the elastic force thereof.

11. A microfilm retrieval apparatus according to claim 10, wherein said holding means comprise projecting members each of which is supported at one end in the vicinity of the periphery of each of said disks and extended in the axial direction thereof.

12. A microfilm retrieval apparatus according to claim 11, wherein the other end of each of said projecting member is provided with a recess for receiving the widthwise end at one end of said microfilm.

13. A microfilm retrieval apparatus according to claim 12, wherein each of said projecting member on one of said disks has an inclined surface which gradually approaches the other disk so that the widthwise ends of said microfilm are pressed by said inclined surfaces.

14. A microfilm retrieval apparatus according to claim 13, wherein a plurality of said projecting members are provided at predetermined intervals along the periphery of each of said disks.

15. A microfilm retrieval apparatus according to claim 14, wherein said two disks are positioned relative to said take-up member so that said projecting members on one of said disks are respectively opposed to the spaces between said adjacent projecting members on the other disk.

16. A microfilm retrieval apparatus according to claim 10, wherein convex portions are provided on said two disks or said take-up member in the lengthwise direction thereof, and concave portions in which said convex portions are respectively extractably received are provided in the other of said two disks or said take-up member so that each of said disks is engaged with the take-up member by respectively inserting said convex portions into said concave portions.

17. A take-up reel applied to a microfilm retrieval apparatus for retrieving a desired image from images recorded on a microfilm by winding a microfilm, which is wound on a cassette reel, on said take-up reel and rewinding said microfilm on said cassette reel after said microfilm has been wound on said take-up reel, said take-up reel comprising:

two disks;

a take-up shaft which rotatably supports said two disks so that said two disks are opposed to each other and can be moved in the direction of separation from each other and which has an outer periphery on which said microfilm is wound between said two disks, portions of said take-up shaft, which rotatably support said two disks, being tapered in such a manner that the diameter of said take-up shaft is gradually reduced from the center to both ends thereof in the lengthwise direction so that said two disks can be oscillated in the direction of separation from each other at the start of winding of said microfilm; and holding means which are provided on the opposite surfaces of said two disks so as to project in the direction of approach to each other for the purpose of holding said microfilm by pressing the widthwise ends of said microfilm wound on said take-up shaft.

18. A take-up reel according to claim 17, wherein said take-up shaft includes a take-up member which constitutes a part of the outer periphery of said take-up shaft and is disposed between said two disks and which is rotated together with said two disks so as to wind said microfilm on the outer periphery thereof.

19. A take-up reel according to claim 17 further comprises urging means for urging said two disks toward each other.

20. A take-up reel according to claim 17, wherein convex portions are provided on said two disks or said take-up member in the lengthwise direction thereof, and concave portions in which said convex portions are respectively extractably received are provided in the other of said two disks or said take-up member.

* * * * *